(12) United States Patent
Parantainen et al.

(10) Patent No.: US 6,253,086 B1
(45) Date of Patent: Jun. 26, 2001

(54) ADAPTIVE FREQUENCY PLANNING IN A CELLULAR NETWORK

(75) Inventors: Janne Parantainen; Oscar Salonaho, both of Helsinki (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/276,127

(22) Filed: Mar. 25, 1999

Related U.S. Application Data

(63) Continuation of application No. PCT/FI97/00582, filed on Sep. 26, 1997.

(30) Foreign Application Priority Data

Sep. 27, 1996 (FI) .......................................... 963903

(51) Int. Cl.$^7$ .............................. H04B 7/00; H04B 17/00; H04Q 7/00
(52) U.S. Cl. ................... 455/446; 455/62; 455/67.1; 455/450; 455/509; 455/515; 375/132
(58) Field of Search ........................... 455/450, 62, 67.1, 455/513, 509, 526, 515, 452, 67.4, 405, 447, 464, 446; 375/344, 132; 370/347

(56) References Cited

U.S. PATENT DOCUMENTS

| | | | |
|---|---|---|---|
| 5,212,831 | * 5/1993 | Chuang et al. | 455/450 |
| 5,448,762 | * 9/1995 | Ward | 455/67.1 |
| 5,491,837 | 2/1996 | Haartsen | 455/62 |
| 5,497,505 | 3/1996 | Koohgoli et al. | 455/452 |
| 5,551,064 | * 8/1996 | Nobbe et al. | 455/62 |
| 5,603,085 | * 2/1997 | Sheldo | 455/450 |
| 5,666,656 | * 9/1997 | Rautiola | 455/513 |
| 5,721,756 | * 2/1998 | Liebetreu et al. | 375/344 |
| 5,787,346 | * 7/1998 | Iseyama | 455/439 |
| 5,898,928 | * 4/1999 | Karlsson et al. | 455/450 |
| 5,901,357 | * 5/1999 | D'Avello et al. | 455/454 |

FOREIGN PATENT DOCUMENTS

| | | |
|---|---|---|
| 0 720 407 | 7/1996 | (EP) . |
| 2 269 298 | 2/1994 | (GB) . |
| WO 95/17048 | 6/1995 | (WO) . |

* cited by examiner

*Primary Examiner*—Lee Nguyen
*Assistant Examiner*—Simon Nguyen
(74) *Attorney, Agent, or Firm*—Altera Law Group, LLC

(57) ABSTRACT

Radio frequencies of a base station in a cellular network are chosen adaptively so that when choosing the uplink frequency the base station measure at all frequencies or at some frequencies of the reception band used in the system what is the total power of the signal received at the frequency in question. The frequency at which the lowest power is received is chosen as uplink frequency. When choosing the downlink frequency, a tuning signal is transmitted at all frequencies or at some frequencies of the transmission band. Mobiles located in areas of other cells and operating at the same frequency experience the effect of the tuning signal as an interference. The base station is tuned to use that downlink frequency at which the interference caused by itself to other traffic is sufficiently low.

17 Claims, 3 Drawing Sheets

ADAPTIVE FREQUENCY PLANNING IN A CELLULAR NETWORK

This application is a continuation of PCT/FI97/00582 filed Sep. 26, 1997.

This invention concerns selection of frequencies in a cellular network comprising several base stations and wherein data transmission between a base station and a mobile in radiocommunication with it takes place at some frequency of a number of frequencies established for the base station in question.

BACKGROUND OF THE INVENTION

A basic idea of the cellular telephone system is to use the system's limited frequency band in such a way that despite limited frequencies it is possible to obtain the required capacity. This is achieved by forming cells. All the frequencies of the system are not available to the cell, but a certain group of frequencies only. The adjacent cell for its part can not use the frequencies of the frequency group of this cell in question, but these frequencies are available in such a cell only, which is located far enough from the cell in question. Signal strengths have hereby dropped sufficiently between cells using the same frequencies, whereby the interference of the same channel is also low enough and will not cause interferences in the radio channel. The allocation of frequencies on the described principle is called reuse of frequencies.

The matter presented above is essential in cellular planning intended to select cell size and system parameters, such as frequency allocation and cell capacity and number, so that such a continuous coverage is achieved economically which will support the required traffic density. Thus, factors to be taken into account in cellular planning are, among others, traffic density in different areas and the maximum transmission power and interference of mobiles.

The term 'reuse factor' relating to the use of frequencies depends on the operator's cellular planning, and interference limitations also set up a limit for the reuse factor. The reuse factor has a decisive importance for the efficiency of the spectrum. The smaller the reuse factor, the more efficient is the use of the frequency spectrum. The reuse factor is determined by relative interference levels, C/I levels, wherein C is the level of the received carrier and I is the interference level. Each factor is affected by the used handover strategy, the power regulation of mobiles, discontinuous transmission DTX and frequency jumping.

In a completed network a separate frequency set is allocated for the cell, that is, a certain number of carriers at a certain frequency, and the reuse factor indicates how far from this cell the same frequencies are reused. Even though a certain number of carriers has been allocated for the cell, this does not always mean that all carriers are in use. The reuse factor is then "loose", whereby if the cell capacity must be increased, it may be increased by introducing more carriers from the cell's frequency set.

If the location and number of base stations are seen as constant, the frequency spectrum allocated for the system establishes an upper limit for the maximum capacity which the network may achieve. To illustrate this, reference is made to FIG. 1, which is a diagrammatic view of a geographical area covered by the cells in a cellular network. It is assumed for the sake of clarity, that the cells are of the same size and they may be presented by circles having the same radius, while base stations BTS shown by black dots are in the center of the cell and the distance between base stations is d. It is assumed that the reuse factor is 4, which means that four frequency sets are required: frequency set A, frequency set B, frequency set C and frequency set D. Thus, the same frequency set may reoccur so that a cell of one frequency set is between the cells of another frequency set, for example, in the manner shown in the figure. The carrier frequency is thus reused at distance D. Assuming that there are two carriers for each cell, that is, there are two carriers in each frequency set, whereby the total number of carriers would be 8, and assuming that a carrier requires a 200 kHz band as in a GSM system, the system shown in the figure as an example would require a frequency band of 1.6 MHz. This illustrates the problem concerning known networks that the network's frequency band sets an upper limit for the network's capacity. To increase the capacity the number of carriers must be increased, and this is possible only by making the frequency band bigger.

Interference can be taken into account as one criterion when the base station controller selects the frequency to be allocated for the connection. The base station may take this information into account when allocating those channels from free channels, which have as low a noise level as possible and when deciding on the cell's internal handover when it has been noticed that some channel of those which are used in traffic suffers from a higher uplink interference level than the ones which exist in any free channels. However, this can hardly be done in practice, because the operator wants the system to have as high a utilization rate as possible so that all channels would be in use. In practice, such a situation can hardly exist, especially in a network with interference limitation: if all channels would be in use in all cells, then the quality of connections would not be acceptable due to the rising interference level. For this reason, the network would be jammed on account of congestion, even if free channels might still be allocated. In such a situation the said interference level of uplink channels can be taken into account. In this way a kind of automatic channel planning between cells is achieved: the use of a certain channel in the first cell leads to an interference level of some magnitude in some other cell, thus preventing from taking into use any such channel which is interfered in this cell and which at the same time interferes with the first cell. This is basically a dynamic method of channel allocation, that is, if a cell is overloaded but cells wherein interfering channels are used are not, then the cell may use these channels temporarily.

According to the above presentation, a separate frequency set is allocated for each cell in a completed cellular network and the reuse factor indicates how far from this cell the same frequencies are reused. To achieve this, much frequency planning work has been needed. Frequency planning is fixed, that is, once frequencies have been allocated to the cells they are permanent. A drawback of fixed frequency planning is that it requires much work and it is not able to adapt itself to changes occurring in traffic volumes. When the network is complemented with new base stations, then a new frequency plan must be made. If a new base station is placed on the margin of the network, then the quantity of necessary work is reasonable, but if the base station or several base stations are located within the network between existing base stations so that their cell size is reduced, then frequency planning will require much work.

U.S. Pat. No. 5,212,831, Chuang and Sollenberger, presents a method and equipment for independent adaptive allocation of frequencies in FDMA and TDMA systems. According to the adaptive method, a frequency is allocated for each base station based on signal strength measurements performed by the base station. The measurements are done so that the base station turns off its own transmitters and listens to the downlink frequencies of other base stations and measures their signal powers. The received frequency with the lowest power is allocated temporarily as the downlink frequency of this base station. Each base station repeats this procedure independently and asynchronically in relation to other base stations. When all base stations have performed the procedure, then each has selected one downlink frequency. Then the same measurement cycle is performed again so many times that the downlink frequencies chosen by the base stations will no longer change or a predetermined number of iteration cycles has been performed.

In the method according to this invention there are at least two obvious drawbacks. Firstly, the base stations have to interrupt their transmission for the time of measurements, which is difficult because during that time and at least at that frequency connections with mobiles can not be kept up. This is harmful for network subscribers. Secondly, the strength of the downlink interference signal of other base stations is measured at the base station performing the measurements, whereby it is possible that the base station will not detect big interferences, but the serving mobiles will nevertheless suffer big interferences.

This second drawback is illustrated in FIG. 2. It shows a situation where base stations BS1 and BS2 are located in the landscape so that a signal between them will not proceed directly but strongly reflected. Such a situation will arise in urban conditions at crossings where buildings prevent the signal from proceeding straightly or in the country where high points in the landscape prevent a straight progress. Hereby, when using the method according to the US patent, BS1 would measure the transmission frequency of BS2 and would find that its interferences are low at this frequency. Correspondingly, BS2 would measure the frequency of BS1 and would find it small. The outcome would be that each base station could tune in on the same downlink frequency. It would result from this that when a car is at point A, it is in traffic connection with base station BTS1 at frequency f, whereby the connection would be of a good quality, but when the car has arrived at a crossing it would receive the frequency transmitted by base station BTS2, whereby it would experience the signal from base station BTS2 at the same frequency as a strong interference. Under these circumstances, at the crossing there would always be a strong interference in the mobile's reception, irrespective of which base station the mobile MS is in connection with.

An objective of the present invention is to bring about adaptive frequency planning without the drawbacks of known methods. The frequency planning must be able to work at the same time as the base station is in normal traffic use, and the planning must be able to take into account any real interferences which the mobile may experience.

The established objectives are achieved through the methods defined in the independent claims. The dependent claims present various ways of implementing the method.

BRIEF SUMMARY OF THE INVENTION

The invention is based on the insight that when choosing uplink frequencies of a tuning base station, the dispatch, that is, the real traffic of transmitter/receivers operating in the cells is listened to, and when choosing downlink frequencies the interference caused by the dispatch of the tuning base station in any transmitter/receiver in the area of other cells is taken into account. The transmitter/receiver may be a test unit, but preferably it is a mobile in the normal traffic operation of the system. Measurements may be performed while the tuning base station is in normal operation in traffic.

Uplink frequencies are chosen so that the base station doing the frequency plan, that is, the tuning base station, with a subset of frequencies of the reception band used in the system or at all frequencies of the reception band measures which is the total power of the signal received at the frequency in question. Depending on the system, the measurement may be performed in different ways. Firstly, the measurement may be performed by measuring the frequency constantly. This manner must be used in FDD systems. Secondly, if the system is a TDM system, the measurement may be performed constantly by seeing if the same frequency is used by several channels, wherein the power may be at different time slots, that is, it may vary between channels, or the measurement may also be performed separately for each time slot in the frame either for each received time slot or just for any desired time slots of the frame. In practice, the first-mentioned way of measuring the entire carrier constantly is preferable.

When the total power received at each frequency has been measured, the frequencies are placed in an order of quality. If powers have also been measured for different time slots, then such time slots of the frequency in question are also placed in an order of quality. A set of uplink frequencies, which may comprise one frequency or several frequencies, is chosen according to this order.

Downlink frequencies are chosen so that at all frequencies of the transmission band or with a subset of frequencies the tuning base station sends a signal which may be an unmodulated carrier or a carrier modulated with noise or with another tuning signal. It is especially preferable to modulate the carrier with some identifiable information. If a test unit located in the area of other cells is in connection with the said other cell at the same signal frequency and at the some moment of time as those at which the tuning base station is transmitting at the moment, it will experience this signal as an interference, whereby the interference level will rise in the receiver. The test unit relays measurement results concerning the quality of the connection through its own base station to the network, which informs the base station making the frequency plan how big an interference it has caused, whereby the base station will deduce whether it may put the frequency/channel in use or whether the following frequency will be examined.

The network preferably controls the entire tuning process. A suitable network element for controlling is, for example, the base station's controller, which gives the tuning base station instructions to transmit an interference signal and, having received the measurement results of the caused interference, it analyses whether the tuning base station may put the said frequency or channel into use or whether measurements will be continued at another frequency. It then commands the tuning base station to operate in accordance with the results of the analysis.

Preferable test units are mobiles operating in the network which even otherwise perform measurement routines required in a mobile telephone system and transmit them at regular intervals to the network. The tuning base station then receives a lot of interference measurement results. Those frequencies are chosen as the set of downlink frequencies, which may comprise one frequency or several frequencies, at which the interference caused by the tuning base station to other traffic is sufficiently low.

LIST OF FIGURES

The invention will be described in greater detail with reference to the appended diagrammatic drawings, wherein FIG. 1 shows cell frequency planning;

DESCRIPTION OF A PREFERABLE EMBODIMENT

Figure 3:
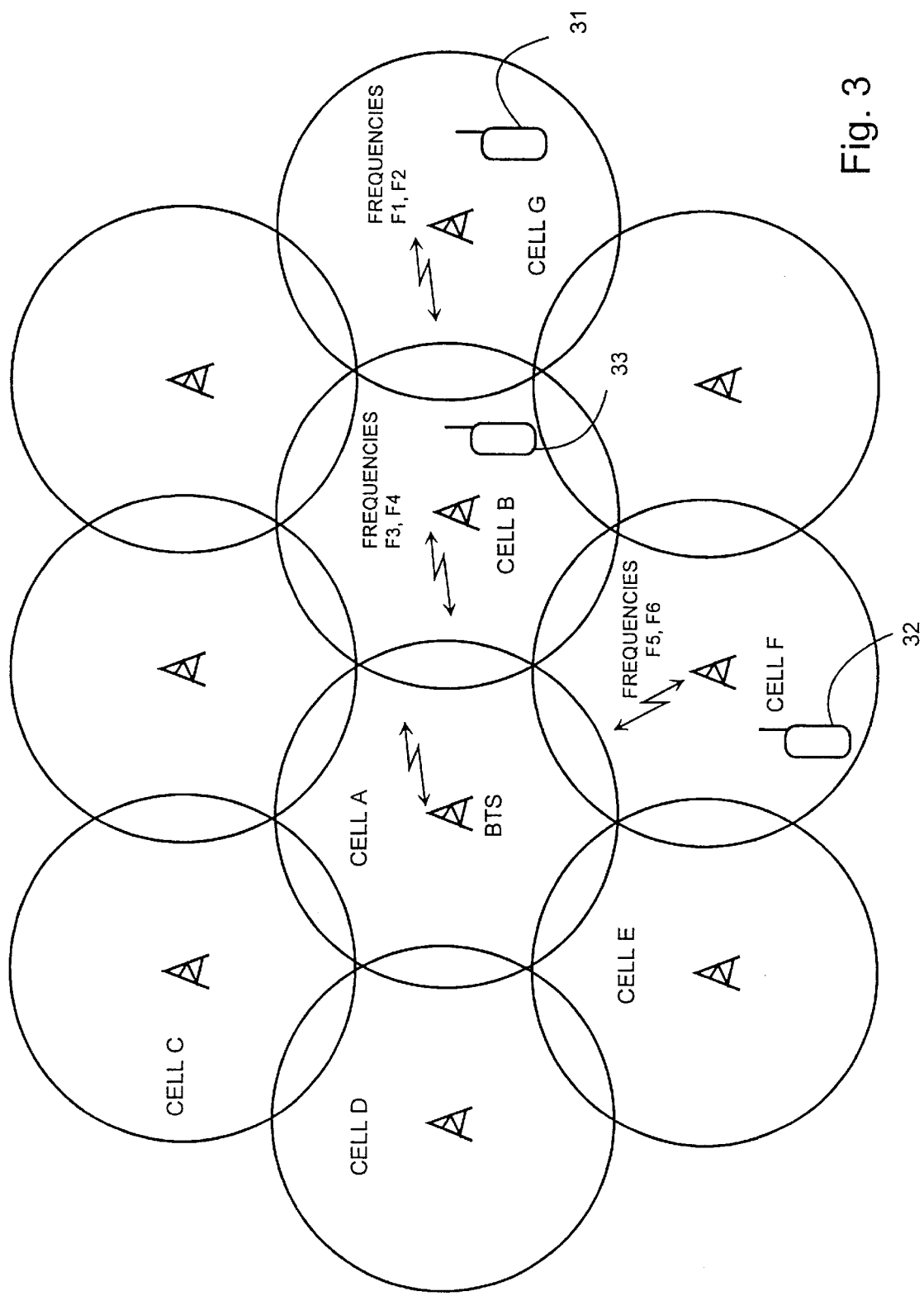
FIG. 3 shows the method of FIG. 1 in a network.

In FIG. 3, cell A is assumed to be a tuning base station which has to choose both uplink and downlink frequencies for itself. It is assumed that the other cells use certain frequencies which are mentioned later and that there is a different frequency in each direction, whereby the system is a Frequency Division Duplex (FDD) or a Frequency Division Duplex/Time Division Duplex (FDD/TDD) system, whereby the latter uses time division, besides frequency division, as in, for example, a GSM system. It is also assumed for the sake of simplicity that each cell uses only one frequency both in the uplink direction and in the downlink direction. Thus, base station BTS of cell G transmits information at the frequency f of a mobile in the cell's area (downlink frequency) and receives its dispatch at frequency $f_2$ (uplink frequency). The corresponding frequencies used by cell B are $f_3$ and $f_4$ while the frequencies of cell F are $f_5$ and $f_6$. The frequencies of other cells are not presented.

Figure 1:
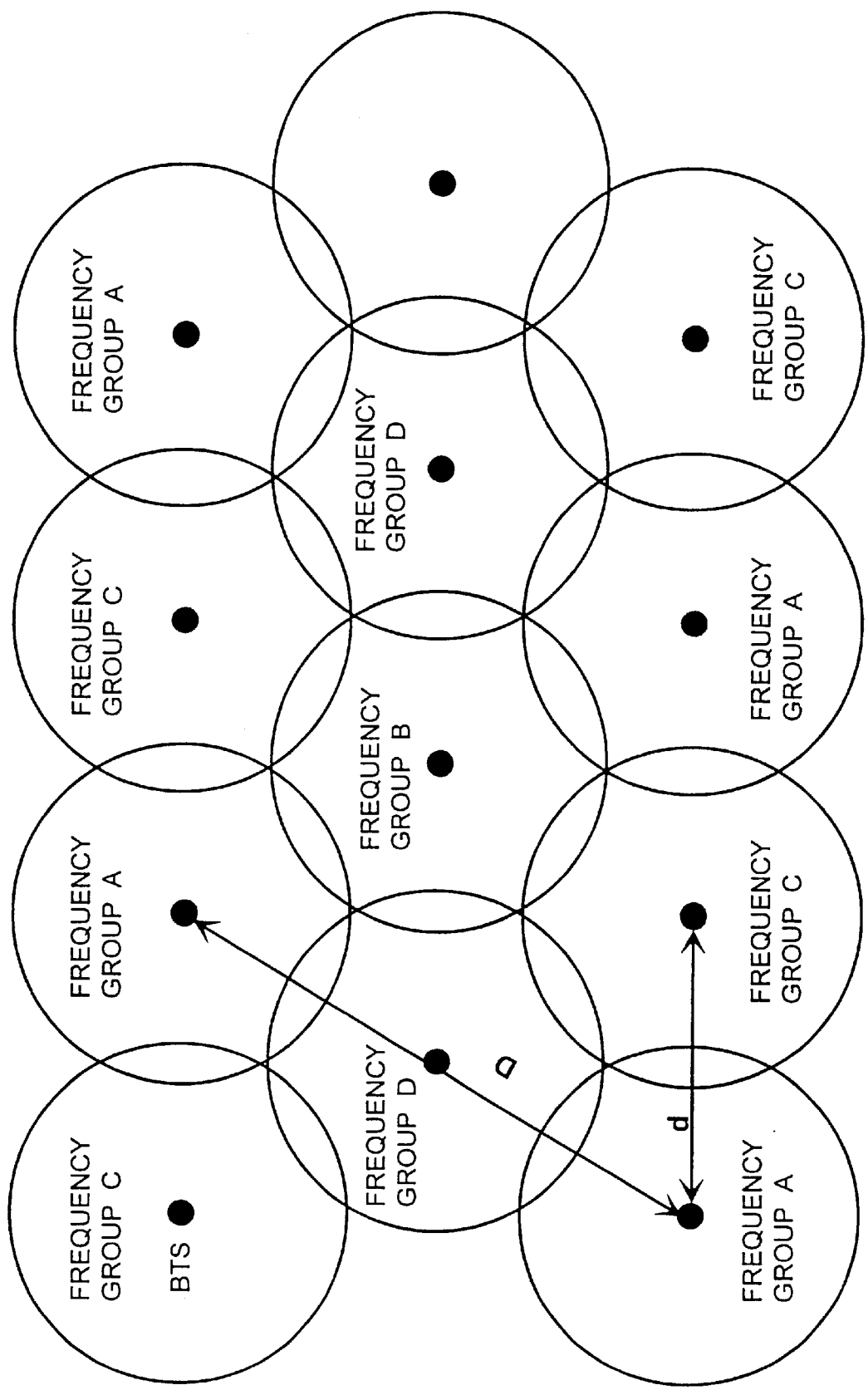
Figure 2:
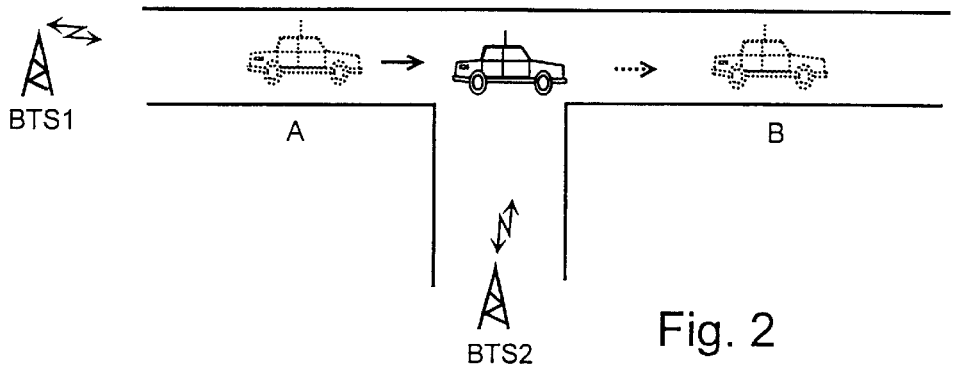
FIG. 2 shows a problematic situation when using a known method.
Figure 4:
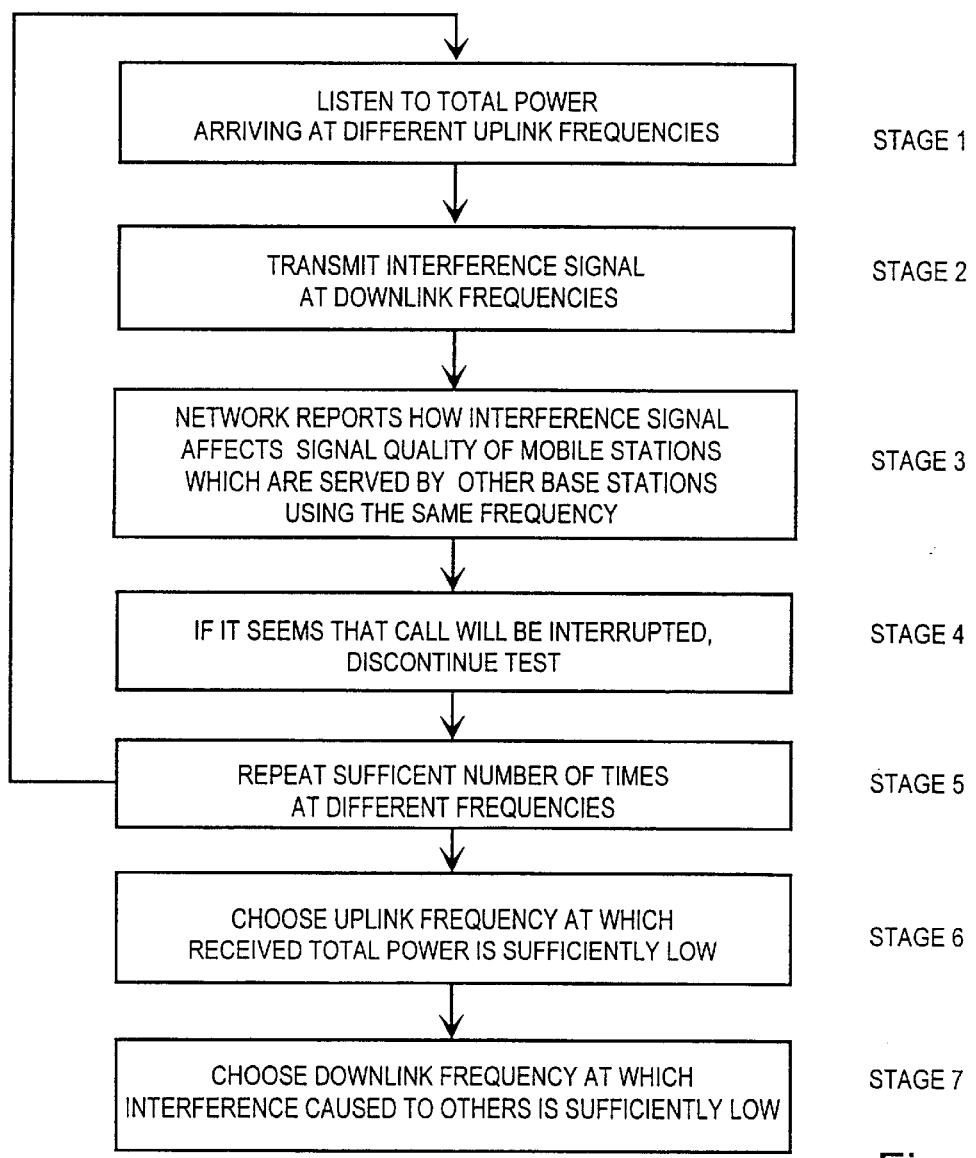
FIG. 4 shows a block diagram of the method.

The method is described with the aid of FIGS. 3 and 4. Base station A starts the tuning by listening to the system's uplink frequencies, that is, the transmissions of mobiles, however, without paying any attention to their information contents but taking into account the received signal power only. This is stage 1 in FIG. 4. In some cases it may listen only to a part of the system's uplink frequencies, but it can listen to all frequencies of the uplink band. The receiver of the base station of cell A is tuned from one frequency to another frequency of the transmission band, and at each frequency it measures the total power received, stage 4 in FIG. 4.

If the system is a FDD system, the total power received at this frequency is measured.

If the system is a FDD/TDD system, only the total power may be measured, if desired, by finding out whether the frequency is divided into time slots. Hereby the base station takes into use all the time slots of the uplink frequency which it has chosen. It is also possible to perform a measurement based on time slots. This requires that the base stations of the network are synchronized or almost synchronized in relation to one another or that they know each other's timing, whereby each base station knows the frame synchronization of the others. Hereby the tuning base station may take into use just a part of the frame's time slots, while the other time slots may be used by other base stations. Of course, a base station may also use all time slots.

Since the powers of real mobile transmissions are measured in the measurements and since traffic density varies in the network according to the hour and weekday, the measurements must last long enough, so that by averaging the results a sufficiently reliable picture is obtained of uplink frequency powers. This means that the measurement process may last for hours, even for days, although the individual measurement may be short. On the other hand, if individual measurements are short bursts, they may be sent in cycles, for example, for a few hours, and decisions may be made based on the material thus obtained. The use of bursts also allows sending them one after another for a short time only, for example, for a few minutes, and some frequency is then chosen for use. After a short time, for example, after half an hour, new measurements of a short duration are made and the results they give will show how to act. This allows one to react very quickly to changes in traffic density occurring in the network.

If the base station is returning and certain transmission/reception frequencies have already been chosen for it, then all other reception frequencies, except the measurement frequency being used, are available for mobile connections and all transmission frequencies of the base station are available in a normal manner. This means that measurements will hardly disturb the operation of the base station and of the mobiles which are in traffic connection with it. A separate test transmitter/receiver may also be used at the base station.

When all uplink frequency powers have been measured, that frequency is chosen as uplink frequency at which the received total power is as low as possible, stage 6 in FIG. 4.

Referring to the example shown in FIG. 3, the measurements of base station A comprise the total power of reception frequency $f_2$ of cell G, the total power of reception frequency $f_4$ of cell B and the total power of reception frequency $f_6$ of cell F. Thus, the frequencies are those which the mobiles in the cell, which are indicated by numbers 31, 32 and 33 in the cells, use in their transmission in the base station direction, and the powers are long-term average powers at the frequencies in question measured by the tuning base station. It is obvious that the longer the distance is between mobiles and tuning base station the less is their effect on the measured long-term power value. Thus, after base station A has arranged all powers of its measured signal frequencies in an order of magnitude, it could find out by studying the list, for example, that the medium power of frequency $f_2$ as measured at base station A has fallen so much that it would not cause any exceeding of the permissible interference level at the base station of cell A, were the base station to choose it as its uplink frequency. Thus, the base station chooses frequency $f_2$ as its uplink frequency. This frequency is also used as uplink frequency in cell G, even though base station A is not able to distinguish different frequency sources from one another. The uplink frequency may of course be chosen by any criterion, for example, one may choose a frequency corresponding to the lowest measured signal power. Base station A could find out from the list that the power measured from signal frequency $f_4$ is so high that should the base station choose it as its uplink frequency, the interference level would be higher than permissible at the base station. Thus, the frequency in question may not be chosen. The same result concerns the frequency $f_6$ used by cell F and in the same way all frequencies of immediately adjacent cells. The frequency $f_4$ is the same as the uplink frequency used by mobile 33 in cell B. However, the base station does not know this, because it is not able to distinguish different frequency sources from each other.

If the cellular system according to FIG. 3 is a TDM system, the method according to the invention makes it possible to choose only certain time slots from the uplink frequency to be chosen, whereby in terms of time the tuned base station will use only a part from the chosen frequency leaving the remaining part to other base stations. As is known, in time-divided systems, the traffic channel is formed of frequency and of time slots so that the carrier frequency is divided into time slots and a number N of successive time slots forms a frame. Hereby N mobiles may use the same carrier at the same time. According to the invention, long-term medium power measurements may also be performed on a time slot basis, whereby of a chosen uplink frequency only certain time slots may be put to use, while the remaining time slots may be left to other base stations. This is especially advantageous when the assumed traffic density is small in the tuning cell. A measurement based on time slots requires synchronization between base stations.

After the uplink frequency has been chosen, the tuning base station of cell A chooses a downlink frequency, which must be such that it will not cause too much interferences in the connections of mobiles operating in other cells.

The downlink frequency is chosen so that the tuning base station sends an interference signal at all carrier frequencies or at their subset of the transmission band of the system's base stations, stage 2 in FIG. 4. In a frequency-divided system, the tuning signal is sent constantly, whereas in time-divided systems the tuning signal may be sent either constantly, if the intention is to put the whole carrier in use, or the tuning signal may be sent only in some time slots of the frame.

If the tuning signal is sent constantly, the transmission first begins with a low power and then rises to a value which is the same as the one calculated in advance as the maximum transmission power for the tuning cell.

If the tuning signal is transmitted in time slots, the signal envelope during rise and fall will follow a shape determined in the system's specifications, for example, a $\cos^2$ curve in a GSM system. Any burst maximum power may be chosen between a very low power and the maximum power, so by choosing in the examined frame time slot, that is, the channel, the transmission power to change, for example, from one time slot to another in a purposeful manner, much information can be obtained about the effect of the interference in other cells. For example, the tuning signal may vary between two values in terms of time. A tuning signal which is sent in time slots also allows measurements of very short duration. For example, the measurement may last for only one frame, in GSM for 4.615 ms or for a few frames or for a multiframe lasting 6.12 seconds. When the power is measured on a time slot basis, tuning bursts can be sent in some time slots only.

The tuning signal causing interference in the receiver may be a pure unmodulated carrier, it may be modulated with noise or with some identifiable information. In digital systems, some suitable identifiable bit pattern may be sent in the tuning burst. It is especially advantageous to send such an identifier in the burst which will individualize the tuning base station in some way. In other cells the receivers will then decode the tuning information and report to the network not only the interference effect but also the source, from which the interference derives. The power variation of the tuning signal mentioned in the preceding paragraph may be used for the same purpose. By varying the power in a certain manner, for example, according to the square wave, the base station causing the interference can be easily identified. When the interference to be identified is fast, short tuning cycles may be used: for example, tuning signal bursts are sent for 10 ms at intervals of 10 minutes. Fast interferences may thus be corrected through coding in the receiver, so the interference will not harm their operation.

A possible procedure is such that the measuring receiver is located in some cell and a base station of this cell is in connection with a receiver at the transmission frequency of the base station. When the measuring receiver receives, besides the serving base station signal, a signal of the same frequency sent by the tuning base station, this will cause interference in the reception: the receiver's interference level will rise in proportion to the tuning signal strength. The receiver performs measurements concerning signal quality and relays the results of the measurement to the network. When such measurements are performed in a sufficient number of cells at the downlink frequencies which they use, the caused interference is found out at each frequency. The network relays this information to the base station, stage 3 in FIG. 4, and based on this information the base station will choose that frequency as downlink frequency at which the interference caused to other traffic and found by measurements will be smallest, stage 7 in FIG. 4.

However, it is not necessary to send measurement results all the time. For example, they may be sent only when a mobile clearly identifies an interference as caused by some base station (as there may be some other reason for the rise of the interference level) or only when the network has informed the mobiles of a beginning tuning measurement and commanded them to send measurement results, if interferences occur in their reception. The mobiles may send measurement results on a normal traffic channel by using a suitable mechanism, for example, by taking some bits of the traffic burst for this purpose.

According to a preferable embodiment, the network attends to the entire tuning process. The base station controller is a suitable network element for this task. The base station controller hereby starts the tuning process of the individual base station, receives the measurement results and reports to the base station which frequencies or channels (frequency/time slot) it must use.

In practice, the use of the above-mentioned separate measuring receiver is difficult and slow, and it is in fact preferable to use as measuring receivers the real mobiles operating in the network. In all cellular networks mobiles constantly perform various measurements to do with signal quality, on which they report at regular intervals to the network. For example, in a GSM system the mobile sends a measurement report twice a second. When the tuning base station sends a tuning signal at different frequencies, the mobiles which receive information at these frequencies from their base station will experience interferences in their reception on which they will report to the network. Thus, the network gets a lot of information at the same time about interferences caused by the signal transmitted by the tuning base station. If a sufficient number of these measurements is made, sufficient statistical information is obtained for concluding at which downlink frequency of the tuning base station least interference will be caused to the traffic of the other cells. The tuning signal may be constant, but it is very advantageous to use short bursts lasting for a few milliseconds, because the interference caused by these in the reception of mobiles can be corrected through channel decoding.

The above presentation is further illustrated with the aid of FIG. 3. A tuning base station in cell A sends a tuning signal i.a. at downlink frequencies $f_1$, $f_3$ and $f_5$ of cells G, B and F. The downlink direction information of the traffic channel of mobiles operating in these cells, which are indicated generally and jointly by reference numbers 31, 33 and 32, is correspondingly relayed at frequencies $f_1$, $f_3$ and $f_5$. In its reception each mobile experiences the signal sent by the tuning base station at the same frequency as an interference, which is stored in those parameters describing the quality of the connection which the mobile is measuring. The mobile sends the information to the base station controller (not shown in the figure) in the network, which will inform the tuning base station about the magnitude of the interference which it has caused. If the interference of the tuning base station is so big that it threatens to cut off the connection of some mobile, the network may interrupt the test for a moment and change the tuning frequency or channel, stage 4 in FIG. 4.

When many tuning tests are made at different hours of the day, the average interference caused to the other traffic by the use of each frequency is found out. This interference is compared with a threshold value. If the interference caused at a certain frequency is too high, then the tuning base station will not use this frequency. If no such frequency is found at which the interference caused to the reception of mobiles served by base stations of other cells would be sufficiently low, then either the tuning is discontinued or a higher interference is accepted, the threshold values are changed and the search is begun from the start. In the latter case the information may be relayed to the base station controller that the maximum load level of the network should be reduced. In a GSM network this is done, for example, by an admission control procedure.

Upon completion of measurements, the base station of cell A is tuned to use that transmission frequency at which the interference to other traffic is sufficiently low. Let us assume that such a frequency would be downlink frequency $f_1$, of cell G. After application of the method according to the invention, the base station would hereby have been tuned to use the same frequencies as cell G.

The response of uplink and downlink frequencies to each other has not been taken into account in the foregoing. In most systems, frequencies are in couples so that a certain reception band frequency corresponds to a certain transmission band frequency, whereby the difference between frequencies is always the same. If applying the method in such a system, the following should be done:

a) the power received from different uplink frequencies is measured in the way described above and the frequencies are arranged in an order of quality based on the measurement, b) the couple corresponding to the best uplink frequency is chosen as tuning signal frequency in the downlink direction, c) the effects of the tuning signal in the reception of mobiles are examined in the manner presented above, d) if the effects are acceptable, the base station begins using this frequency couple, e) the search is finished or the chosen uplink and downlink frequencies are removed from the lists of quality and the next step is item b for finding the following frequency couple, f) if the effects are not acceptable, the couple corresponding to the next best uplink frequency is chosen as tuning signal in the downlink direction and its effect is studied and the steps according to items c, d and e are taken etc., g) if no suitable frequency couple is found, the tuning of the base station is interrupted or the limit of acceptable interferences is raised and the search is started again from item a.

Any desired number of frequency couples can be chosen for the base station by using this procedure.

All base stations in the network may tune by the method according to the invention and tuning may be a continuous process, one performed at suitable intervals or by a special order. It is not essential from the viewpoint of the invention who gives the order. It is advantageous to let the network attend to the entire tuning process, whereby the base station performs measurements of the uplink power, sends a tuning signal under control by the network and tunes to use frequencies stated by the network and the base station may also start tuning independently. In all cases the network's frequency plan adapts automatically to the traffic in the network and the base stations use the frequencies at which they receive as little interference as possible in the uplink direction and at which they cause as little interference as possible to the traffic in other cells in the downlink direction.

When the base stations have tuned, the network or the base stations begin collecting information on normal traffic interferences. If due to installation of new base stations or for any other reason the chosen frequency or frequencies are no longer suitable, the base stations will tune to a new frequency by the method according to the invention. Tuning will hardly impede other traffic, if the system is a time-divided one, because some time slots may relay normal traffic and other time slots are used for uplink and downlink measurements. In a purely frequency-divided system the other frequencies are of course available, except the tuning frequencies.

The above presentation has mainly studied one frequency at a time. It is known that time-divided mobile networks use frequency jumping, wherein the frequency/time slot couples of the traffic channel change in accordance with some predetermined frequency jumping pattern. The presented method makes it possible to choose the best possible frequency jumping pattern when the interference caused at different frequencies and at their different time slots is known or the power received in the uplink direction is known based on measurements. Conversely, it is possible in tuning to examine desired frequency jumping patterns only and to choose such a pattern in the use of which the caused interference is acceptably low or the received power is acceptably low.

The work required in frequency planning is reduced considerably by using the presented method. Base stations may easily be added to the network and they will independently seek such frequencies or channels in the use of which they will interfere as little as possible with connections in other cells. Hereby the adding of new base stations will not require any new frequency planning. In addition, the operation of a base station in normal use need not be interrupted while it is in the tuning stage. When choosing a suitable tuning signal for use when looking for the downlink frequency, the tuning will not at all disturb normal operation in the network, because any increase of the interference level in the mobile reception can be compensated for by a power adjustment of the base station in connection with the mobile. If the tuning signal is of a short duration, that is, if bursts are transmitted, any information that may be destroyed can be replaced with the aid of error correction. Decisions on the selection of uplink frequencies are based solely on the measurement of the total power received at different frequencies, whereas decisions on the selection of downlink frequencies are based on chosen criteria, which may be Bit Error Rate (BER), relative interference level C/I and Frame Error Rate (FER) or detection of variation in the interference level or other measured quality/power occurring in different channels. For this reason, the method may be implemented with simple and advantageous technology.

What is claimed is:

1. Method of selecting radio frequencies for a tuning base station in a cellular network comprising:

establishing a set of transmission frequencies and a set of reception frequencies for a plurality of base stations and where during the traffic connection between a base station and a mobile station, the base station receives at the allocated reception frequency and transmits at the allocated transmission frequency and the mobile station carries out routine measurements of quality of the connection and sends a measure report to the network, wherein choosing the set of transmission frequencies for use at the tuning base station comprises:

transmitting a tuning signal from the tuning base station at at least a part of the transmission frequencies used in the network so that the tuning signal is transmitted several times, without regard to time slots, at each transmission frequency for determining an average interference effect, observing an interference effect caused by the tuning signal in the routine measurements by at least one mobile station, with which a base station of some other cell is in connection at the same transmission frequency at which the tuning signal is transmitted, calculating an average interference effect of interference effects, and choosing a desired number of frequencies, at which the average interference effect caused in traffic connections in other cells is acceptably low, to be the set of transmission frequencies.

2. Method as defined in claim 1, wherein in the selection of transmission frequency observation is made of the effect of the tuning signal transmitted by the base station on the reception of mobiles operating in the network.

3. Method as defined in claim 1, wherein when the reception frequency and transmission frequency form a frequency couple at a standard frequency distance from each other couples are formed so that a tuning signal is sent from the base station in the network at that transmission frequency which forms a couple with a frequency belonging to a set of reception frequencies and if the average interference effect caused by the tuning signal is sufficiently low, this reception frequency belonging to the set and the transmission frequency of the transmitted tuning signal are accepted as a couple.

4. Method as defined in claim 1, wherein the interference effect is a rise in the interference level and/or a rise in the bit error rate.

5. Method as defined in claim 1, wherein the tuning signal power varies in a predetermined manner.

6. Method as defined in claim 1, wherein the tuning signal is noise.

7. Method as defined in claim 1, wherein the tuning signal contains information identifying the tuning base station.

8. Method of selecting radio frequencies for a tuning base station in a cellular network comprising:

establishing a set of transmission frequencies and a set of reception frequencies for a plurality of base stations, and wherein during the traffic connection between base station and a mobile station, the base station receives at the allocated reception frequency and transmits at the allocated transmission frequency and the mobile station carries out routine measurements of quality of the connection and sends a measure report to the network, wherein choosing the set of transmission frequencies for use at a tuning base station comprises:

transmitting a tuning signal from the tuning base station at at least a part of the transmission frequencies used in the network so that the tuning signal is transmitted several times within time slots, at each transmission frequency for determining an average interference effect, wherein the time slots are time slots of a frequency jumping sequence, observing an interference effect caused by the tuning signal in the routine measurements by at least one mobile station, with which a base station of some other cell is in connection at the same transmission frequency at which the tuning signal is transmitted, calculating an average interference effect of interference effects, and choosing a desired number of frequencies, at which the average interference effect caused in traffic connections in other cells is acceptably low when using time slots of a certain frequency jumping sequence, to be the set of transmission frequencies.

9. Method as defined in claim 6, wherein the tuning signal is transmitted in a certain number of successive frames only.

10. Method as defined in claim 6, wherein from frequencies and time slots suitable frequency/time slot couples are chosen from which a frequency jumping sequence is formed.

11. Method as defined in claim 8, wherein the time slots are time slots of a predetermined frequency jumping sequence, whereby the tuning signal frequency may change from one time slot to another according to the frequency jumping sequence, whereby at the chosen frequencies transmission may take place at those jumping sequences only, where the caused interference is acceptably low.

12. Method as defined in claim 2, wherein in the selection of transmission frequency observation is made of the effect of the tuning signal transmitted by the base station on the reception of mobiles operating in the network.

13. Method as defined in claim 2, wherein when the reception frequency and transmission frequency form a frequency couple at a standard frequency distance from each other couples are formed so that a tuning signal is sent from the base station in the network at that transmission frequency which forms a couple with a frequency belonging to a set of reception frequencies and if the average interference effect caused by the tuning signal is sufficiently low, this reception frequency belonging to the set and the transmission frequency of the transmitted tuning signal are accepted as a couple.

14. Method as defined in claim 2, wherein the interference effect is a rise in the interference level and/or a rise in the bit error rate.

15. Method as defined in claim 2, wherein the tuning signal power varies in a predetermined manner.

16. Method as defined in claim 2, wherein the tuning signal is noise.

17. Method as defined in claim 2, wherein the tuning signal contains information identifying the tuning base station.

* * * * *